United States Patent
Peng et al.

(10) Patent No.: US 8,118,271 B2
(45) Date of Patent: Feb. 21, 2012

(54) MOUNTING APPARATUS FOR DATA STORAGE DEVICE

(75) Inventors: Wen-Tang Peng, Taipei Hsien (TW); Zhe Zhang, Shenzhen (CN); Han-Long Ge, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 308 days.

(21) Appl. No.: 12/632,784

(22) Filed: Dec. 7, 2009

(65) Prior Publication Data

US 2010/0294905 A1     Nov. 25, 2010

(30) Foreign Application Priority Data

May 21, 2009 (CN) .......................... 2009 1 0302514

(51) Int. Cl.
*A47B 96/00* (2006.01)

(52) U.S. Cl. ............. 248/222.11; 248/27.3; 248/221.11; 361/679.31; 361/679.37

(58) Field of Classification Search ................. 248/27.1, 248/27.3, 221.11, 222.411, 224.7, 316.8; 361/679.31, 679.33, 679.37
See application file for complete search history.

(56) References Cited

U.S. PATENT DOCUMENTS

| | | | | |
|---|---|---|---|---|
| 6,058,016 A * | 5/2000 | Anderson et al. | ............. | 361/727 |
| 6,359,778 B1 * | 3/2002 | Wu | ............. | 361/679.33 |
| 7,072,177 B2 * | 7/2006 | Peng et al. | ............. | 361/679.33 |
| 7,477,511 B2 * | 1/2009 | Hsu et al. | ............. | 361/679.37 |
| 7,511,953 B2 * | 3/2009 | Tao et al. | ............. | 361/679.39 |
| 7,609,511 B2 * | 10/2009 | Peng et al. | ............. | 361/679.37 |
| 7,701,703 B2 * | 4/2010 | Peng et al. | ............. | 361/679.33 |
| 7,701,707 B2 * | 4/2010 | Peng et al. | ............. | 361/679.37 |
| 7,791,871 B2 * | 9/2010 | Peng et al. | ............. | 361/679.33 |
| 7,848,096 B2 * | 12/2010 | Peng et al. | ............. | 361/679.33 |
| 7,848,099 B1 * | 12/2010 | Zhang et al. | ............. | 361/679.38 |
| 7,864,522 B1 * | 1/2011 | Peng et al. | ............. | 361/679.33 |
| 8,009,425 B2 * | 8/2011 | Kang | ............. | 361/679.58 |
| 2005/0237707 A1 * | 10/2005 | Connelly et al. | ............. | 361/685 |
| 2010/0302722 A1 * | 12/2010 | Kang | ............. | 361/679.31 |
| 2011/0001031 A1 * | 1/2011 | Peng et al. | ............. | 248/316.7 |
| 2011/0013352 A1 * | 1/2011 | Chuang | ............. | 361/679.31 |
| 2011/0042985 A1 * | 2/2011 | Peng et al. | ............. | 294/86.4 |
| 2011/0049319 A1 * | 3/2011 | Peng et al. | ............. | 248/309.1 |
| 2011/0095151 A1 * | 4/2011 | Zhang et al. | ............. | 248/222.12 |
| 2011/0095153 A1 * | 4/2011 | Zhang et al. | ............. | 248/309.1 |

* cited by examiner

*Primary Examiner* — Terrell McKinnon
*Assistant Examiner* — Bradley Duckworth
(74) *Attorney, Agent, or Firm* — Altis Law Group, Inc.

(57) ABSTRACT

A mounting apparatus includes a bracket defining at least one clamping hole, a receiving rack, and a latching unit pivotally mounted to the receiving rack. The latching unit includes a fitting member, a locking member pivotally mounted to the fitting member, a contact member slidably attached to the fitting member, and a first resilient member resisting the contact member and the locking member. A latching block extends from the locking member to latch with the receiving rack. The contact member includes at least one latching tab and a pushrod opposite to the latching tab. When the latching tab is moved to deform the first resilient member, the pushrod rotates the locking member, resulting in the latching block disengaging from the receiving rack. Elasticity of the first resilient member engages the latching tab in the clamping hole.

20 Claims, 6 Drawing Sheets

MOUNTING APPARATUS FOR DATA STORAGE DEVICE

BACKGROUND

1. Technical Field

The disclosure relates to mounting apparatuses for data storage devices, and particularly to a mounting apparatus that readily secures a data storage device in a computer enclosure.

2. Description of Related Art

Generally speaking, when a computer is assembled, a bracket is mounted in a computer enclosure, to which data storage devices will be attached, often by screws. This methodology can be tedious and time-consuming. Moreover, in this process, one or more screws can easily fall into the crowded interior of the computer enclosure, thus requiring a difficult retrieval.

DETAILED DESCRIPTION

Figure 5:
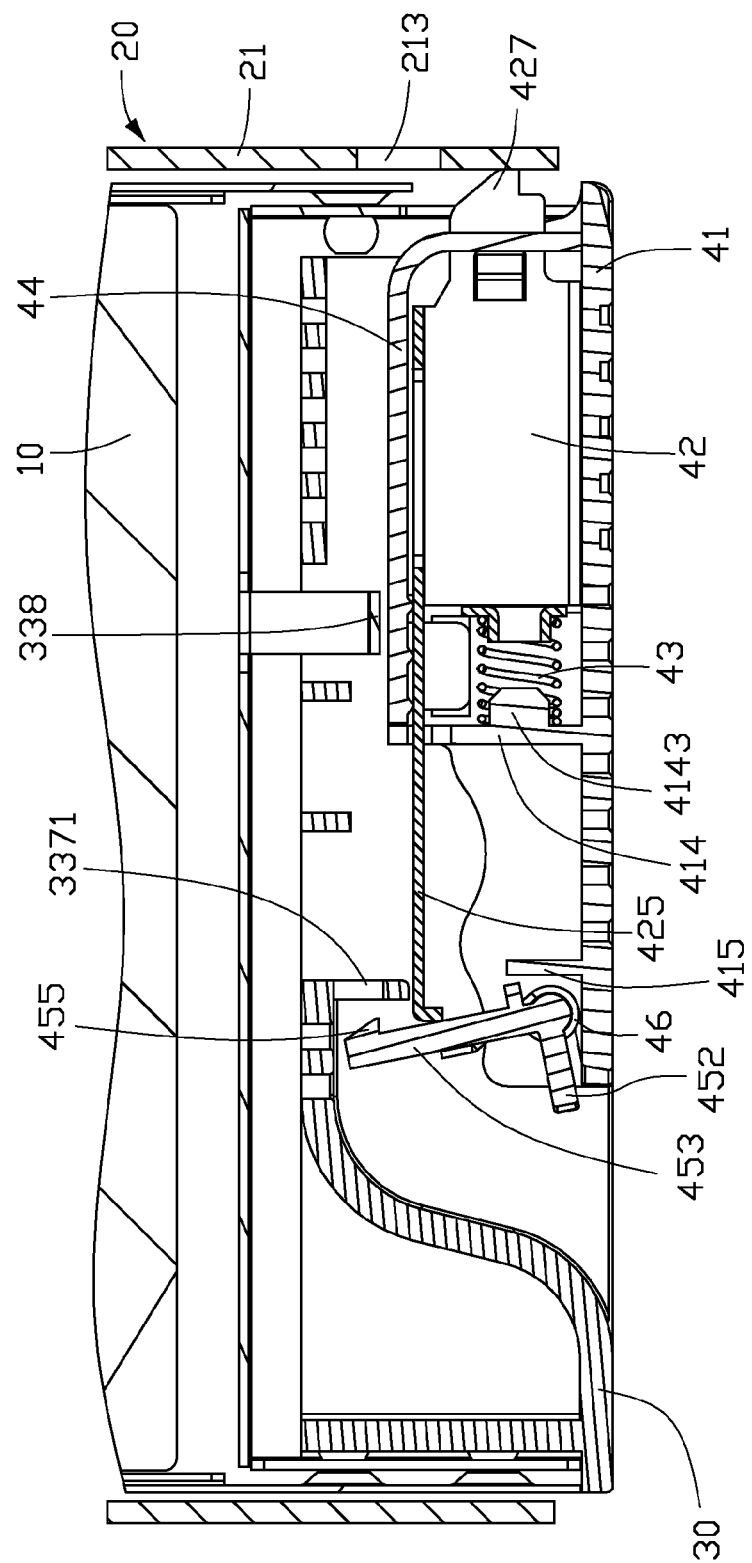
FIG. 5 is a cross-section of FIG. 1, taken along the line V-V, together with a bracket for receiving the mounting apparatus.

Referring to FIG. 5, an exemplary embodiment of a mounting apparatus is provided to fix a data storage device 10 to a bracket 20 fixed in a computer (not shown). The bracket 20 includes a sidewall 21 defining two clamping holes 213 aligned in a line.

Figure 1:
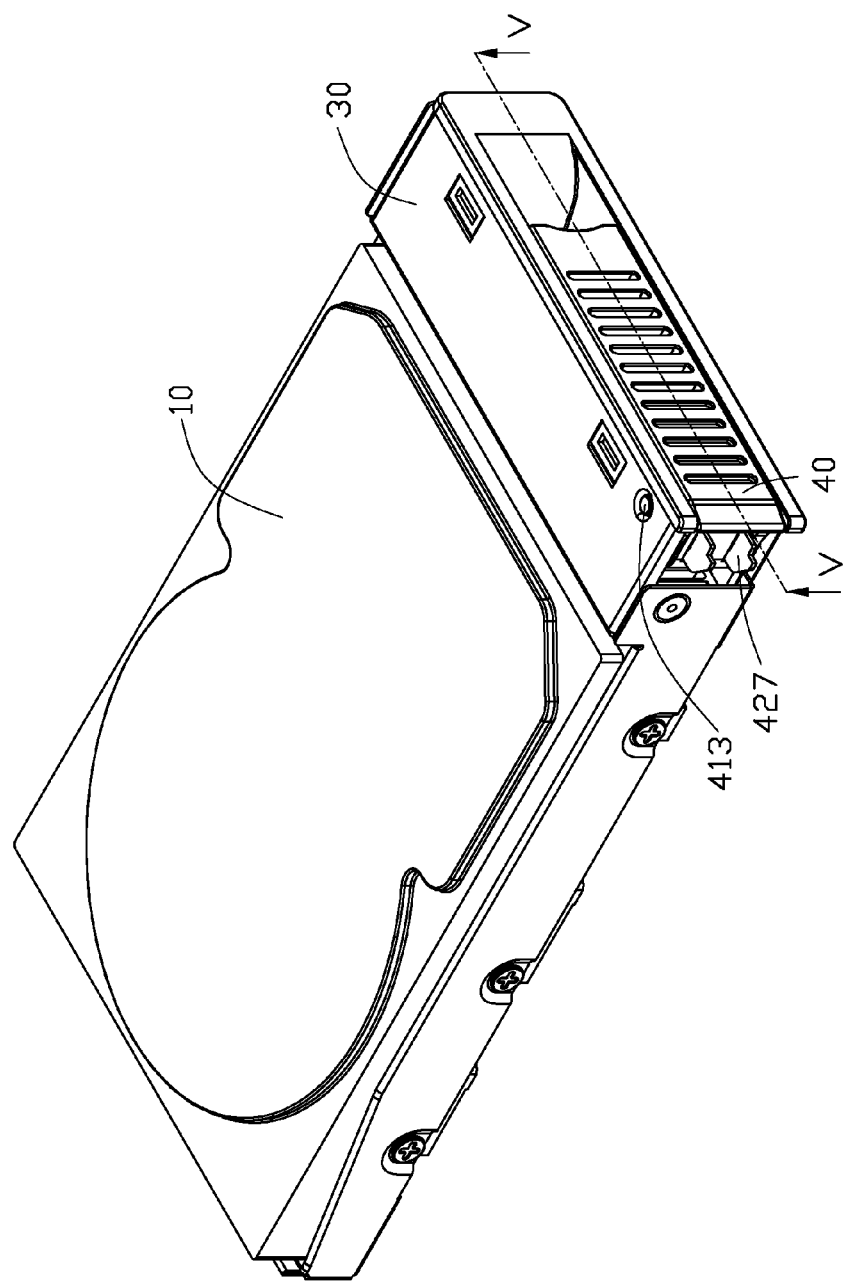
FIG. 1 is an assembled, isometric view of an exemplary embodiment of a mounting apparatus, together with a data storage device fixed therein.

Referring to FIG. 1, the mounting apparatus includes a receiving rack 30 for receiving the data storage device 20, and a latching unit 40 pivotally mounted to the receiving rack 30.

Figure 2:
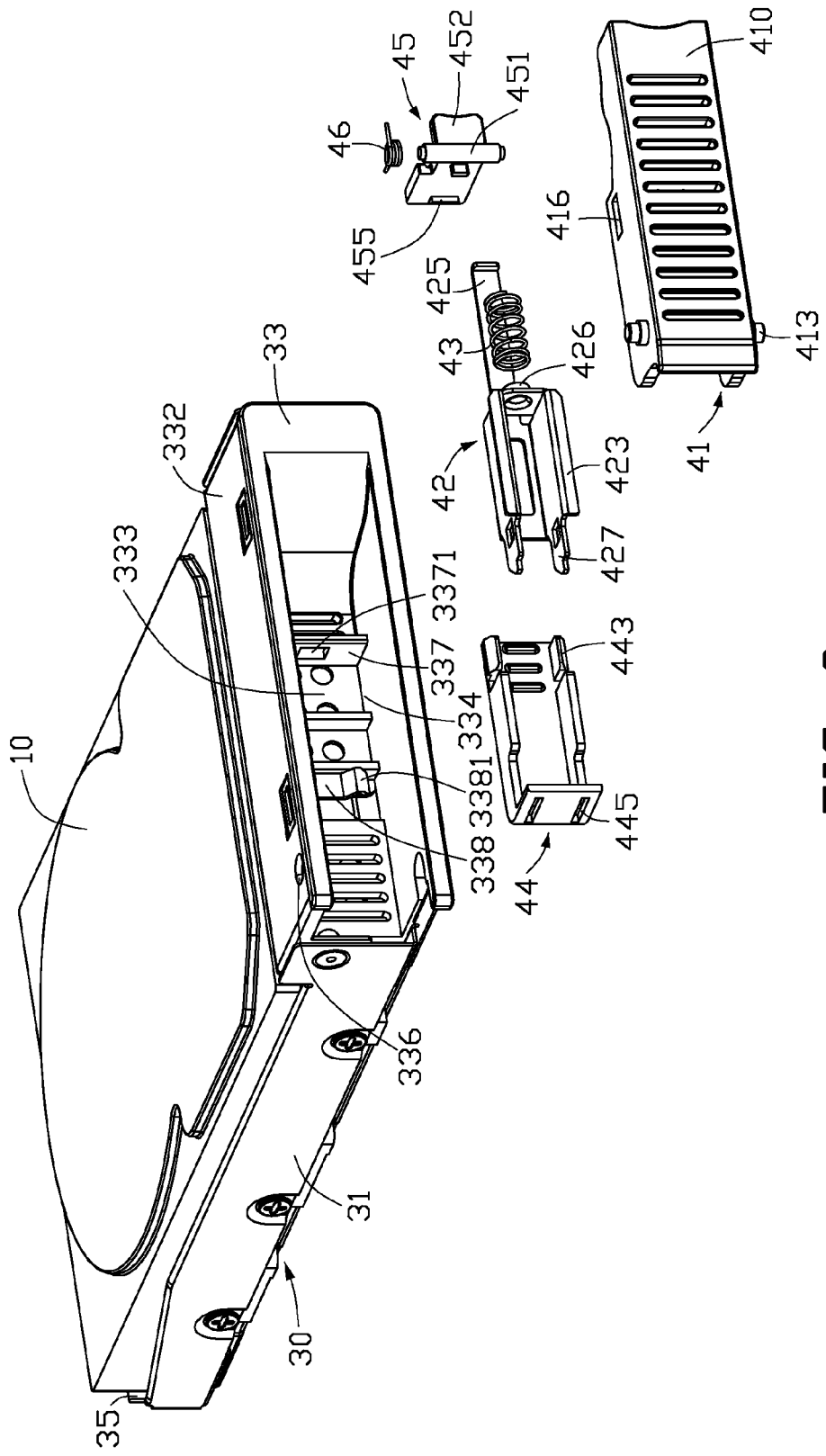
FIG. 2 is an exploded, isometric view of FIG. 1, the mounting apparatus includes a latching unit.

Referring to FIG. 2, the receiving rack 30 includes opposite side plates 31 for sandwiching sidewalls of the data storage device 10, a rear plate 35 connecting rear ends of the side plates 31 for resisting a rear side of the data storage device 10, and a fixing member 33. The fixing member 33 includes a resisting plate 333 vertically located between the front ends of the side plates 31, and two fixing plates 332 extending from opposite edges of the resisting plate 333. Hence, a receiving groove 334 is formed between the fixing plates 332. Two pivoting holes 336 are defined in the fixing plates 332, respectively, both neighboring an opening of the receiving groove 334. A matching board 337 is formed in the receiving groove 334, and opposite ends of the matching board 337 are connected to inner sides of the fixing plates 332. The matching board 337 defines a matching hole 3371. An elastic tab 338 extends from the resisting plate 333, situated between the pivoting holes 336 and the matching board 337 and in the receiving groove 334. A resisting protrusion 3381 protrudes from a distal end of the elastic tab 338.

Figure 3:
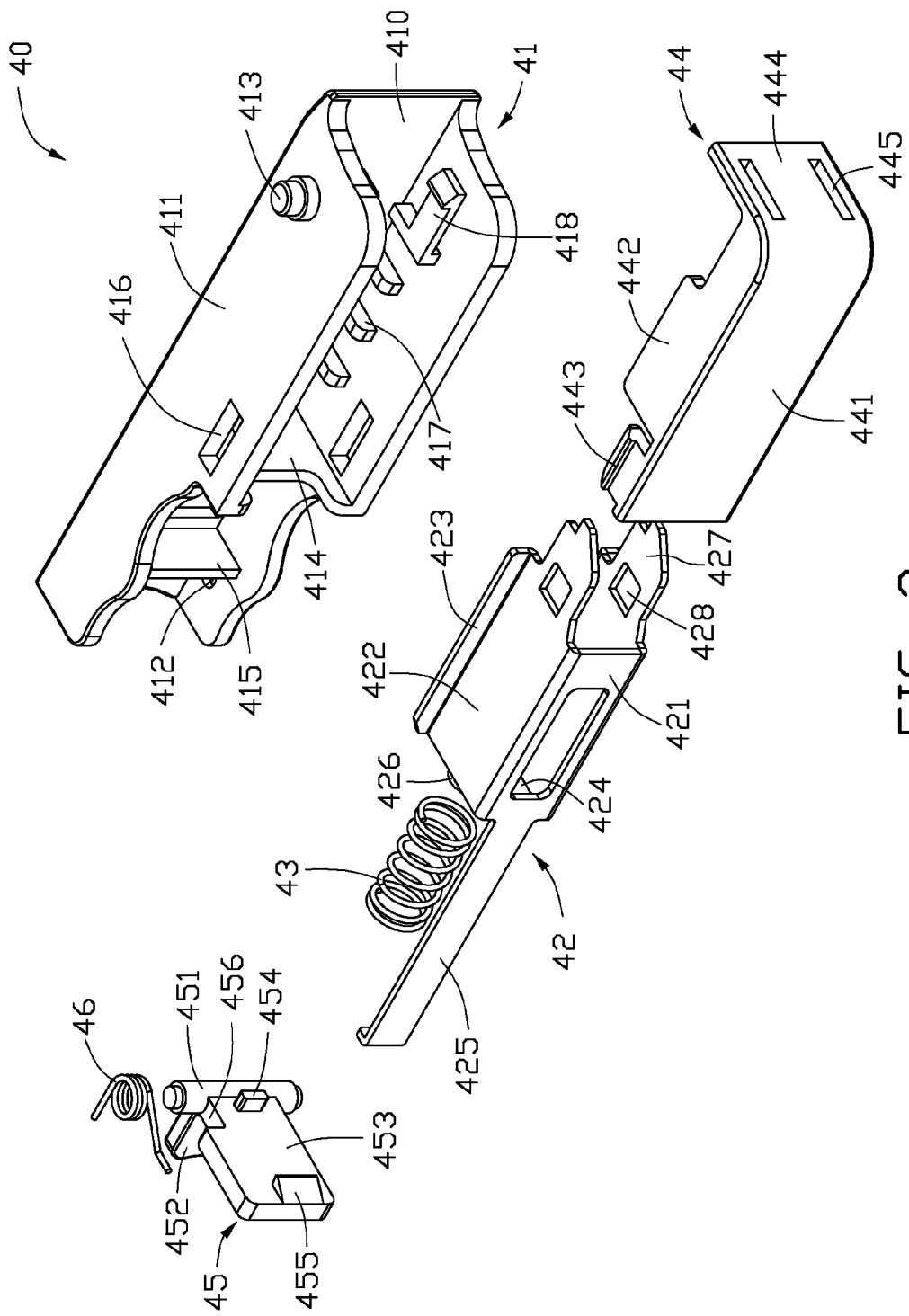
FIG. 3 is an enlarged, exploded view of the latching unit of FIG. 2, but viewed from another perspective.

Referring also to FIG. 3, the latching unit 40 includes a fitting member 41, a contact member 42, a first resilient member 43, a positioning member 44, a locking member 45, and a second resilient member 46. In this embodiment, the first resilient member 43 is a coil spring, and the second resilient member 46 is a torsional spring having two feet.

The fitting member 41 includes a baffle plate 410, and two securing panels 411 extending from opposite edges of the baffle plate 410. Two fixing shafts 413 extend outward from first ends of the securing panels 411, respectively. Two shaft slots 412 are defined in inner sides of the securing panels 411, respectively, adjacent to second ends of the securing panels 411. A first connecting board 415, and a second connecting board 414 parallel to the first connecting board 415 are perpendicularly formed between the securing panels 411. The first connecting board 415 is situated adjacent to the shaft slots 412. A fixing post 4143 (shown in FIG. 5) extends from a side of the second connecting board 415, far away from the first connecting boars 415. A hook slot 416 is defined in each securing panel 411, neighboring the second connecting board 414. A plurality of positioning blocks 417 parallel to the second connecting board 414 and an elastic clamping hook 418 perpendicular to the second connecting board 414 extend from the inner side of each securing panel 411. The positioning blocks 417 and the clamping hooks 418 are sequentially situated neighboring the first ends of the securing panels 411, and spaced from the baffle plate 410.

The contact member 42 includes a sidewall 421, two resisting walls 422 perpendicularly extending from opposite edges of the sidewall 421, and a connecting wall 424 perpendicularly connecting the resisting walls 422 and the sidewall 421. Two flanges 423 opposite to each other perpendicularly extend from edges of the resisting walls 422 away from the sidewall 421. A latching tab 427 having a slant distal end, extends from an end of each resisting walls 422, away from the connecting wall 424. Two through slots 428 are defined in the latching tabs 427 neighboring the corresponding resisting walls 422, respectively. An L-shaped pushrod 425 extends from an end of the sidewall 421, away from the latching tabs 427, and perpendicular to the connecting wall 424. A fixing post 426 extends from the connecting wall 424, facing the pushrod 425.

The positioning member 44 includes a main board 441, and an end board 444 extending from a first end of the main board 441. The end board 444 defines two through holes 445, through which the latching tabs 427 of the contact member 42 pass. Two clamps 443 and two side boards 442 perpendicularly extend from opposite edges of the main board 441, respectively.

The locking member 45 includes a pivoting shaft 451, a clamping portion 453 extending from a middle portion of a circumference of the pivoting shaft 451, and an operating portion 452. The operating portion 452 extends from the circumference of the pivoting shaft 451, substantially perpendicular to the clamping portion 453. A protrusion 454 protrudes from a first side of the clamping portion 453, opposite the operating portion 452 and close to the pivoting shaft 451. A wedge-shaped latching block 455 extends from the first side of the clamping portion 453, away from the pivoting shaft 451. An abutting portion 456 is defined at a top of the clamping portion 453.

Figure 4:
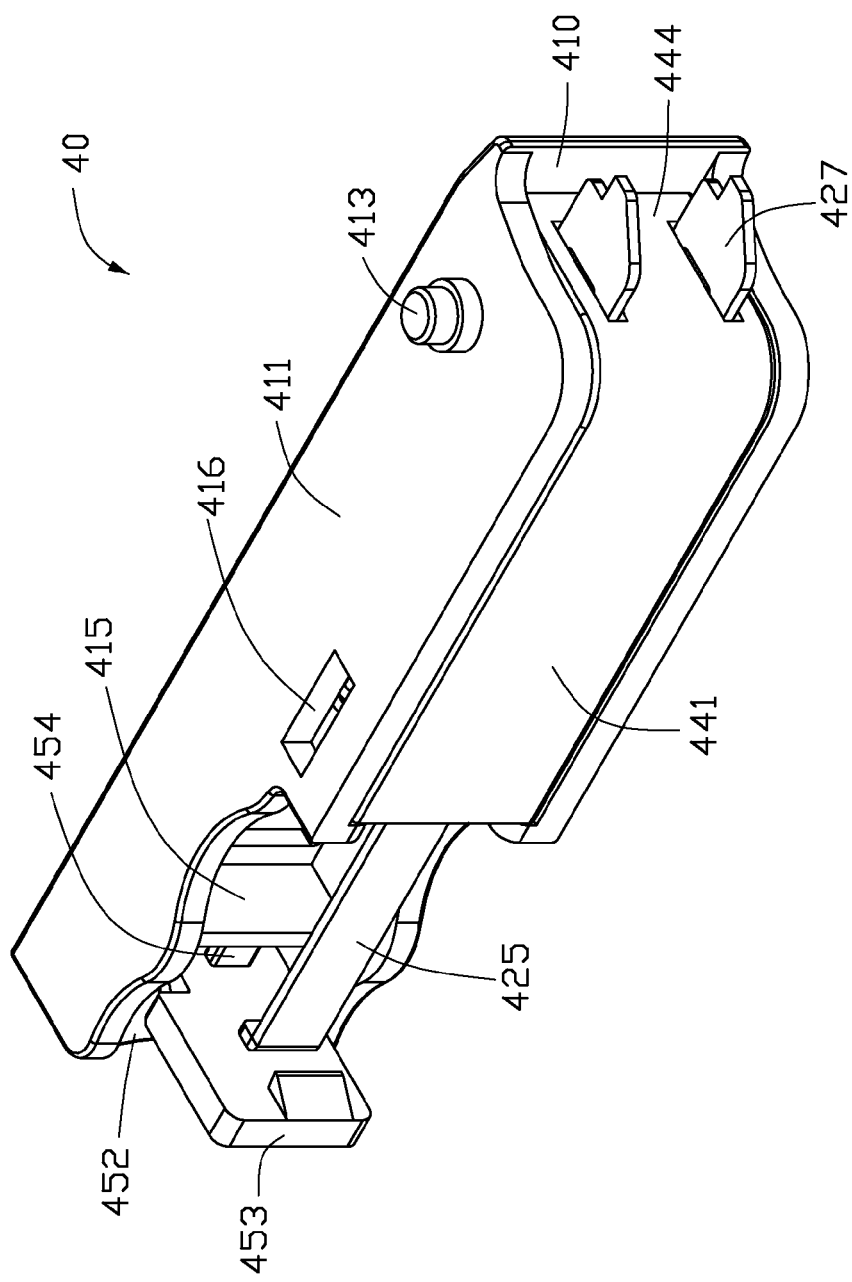
FIG. 4 is an assembled, isometric view of the latching unit of FIG. 3.

Referring to FIG. 4, in assembly of the latching unit 40, the second resilient member 46 is fitted about the pivoting shaft 451 of the locking member 45. Opposite ends of the pivoting shaft 451 are pivotally engaged in the shaft slots 412 of the fitting member 41, respectively. Therefore, the locking member 45 together with the second resilient member 46 is mounted to the fitting member 41, with the protrusion 454 of the locking member 45 abutting the first connecting board 415. One foot of the second resilient member 46 resists the baffle plate 410 of the fitting member 40, and the other foot rounds the abutting portion 456 of the clamping portion 453 of the locking member 45, and resists a side of the clamping portion 453 opposite to the first side of the clamping portion 453.

The contact member 42 is received in the positioning member 44, with the resisting walls 422 abutting the side boards 442. Thus, the latching tabs 427 of the contact member 42 pass through the through holes 445 of the positioning member 44, respectively. The flanges 423 of the contact member 42 are received in the fitting member 41, between the positioning blocks 417 and the baffle plate 410 of the fitting member 41. Two ends of the first resilient member 43 are fitted about the fixing post 426 of the contact member 42 and the fixing post 4143 of the fitting member 41. As a result, the resisting walls 422 of the contact member 42 resist the positioning blocks 417, respectively, with the clamping hooks 418 of the fitting member 41 slidably engaging in the corresponding through slots 428 of the contact member 42. The side boards 442 resist the securing panels 411 of the fitting member 41, respectively. The clamps 443 of the positioning member 44 engage in the hook slots 416 of the fitting member 41, to retain the positioning member 44 in the fitting member 41. The pushrod 425 of the contact member 42 resists the first side of the clamping portion 453 of the locking member 45. Two opposite ends of the first resilient member 43 abut the second connecting member 414 and the connecting wall 424 of the contact member 42.

Referring to FIGS. 1 and 2, during assembly of the latching unit 40 to the receiving rack 30, the fixing shafts 413 of the fitting member 41 of the latching unit 40 are received in the pivoting holes 336 of the receiving rack 30, such that the latching unit 40 is pivotally mounted to the receiving rack 30. Thereafter, the latching unit 40 is pivoted into the receiving groove 334 of the receiving rack 30, with the latching block 455 of the locking member 45 of the latching unit 40 resisting the matching board 337 of the receiving rack 30. As a result, the locking member 45 is rotated to deform the second resilient member 46. When the latching unit 40 is completely received in the receiving groove 334, the elasticity of the second resilient member 46 rotates the locking member 45 towards the matching board 337, with the latching block 455 engaging in the matching hole 3371 of the matching board 337. The latching unit 40 is thus mounted to the receiving rack 30, with the latching tabs 427 of the latching unit 40 protruding from the receiving rack 30. The main board 441 of the positioning member 44 of the latching unit 40 resists the resisting protrusion 3381 of the elastic tab 338 of the receiving rack 30, to deform the elastic tab 338.

Figure 6:
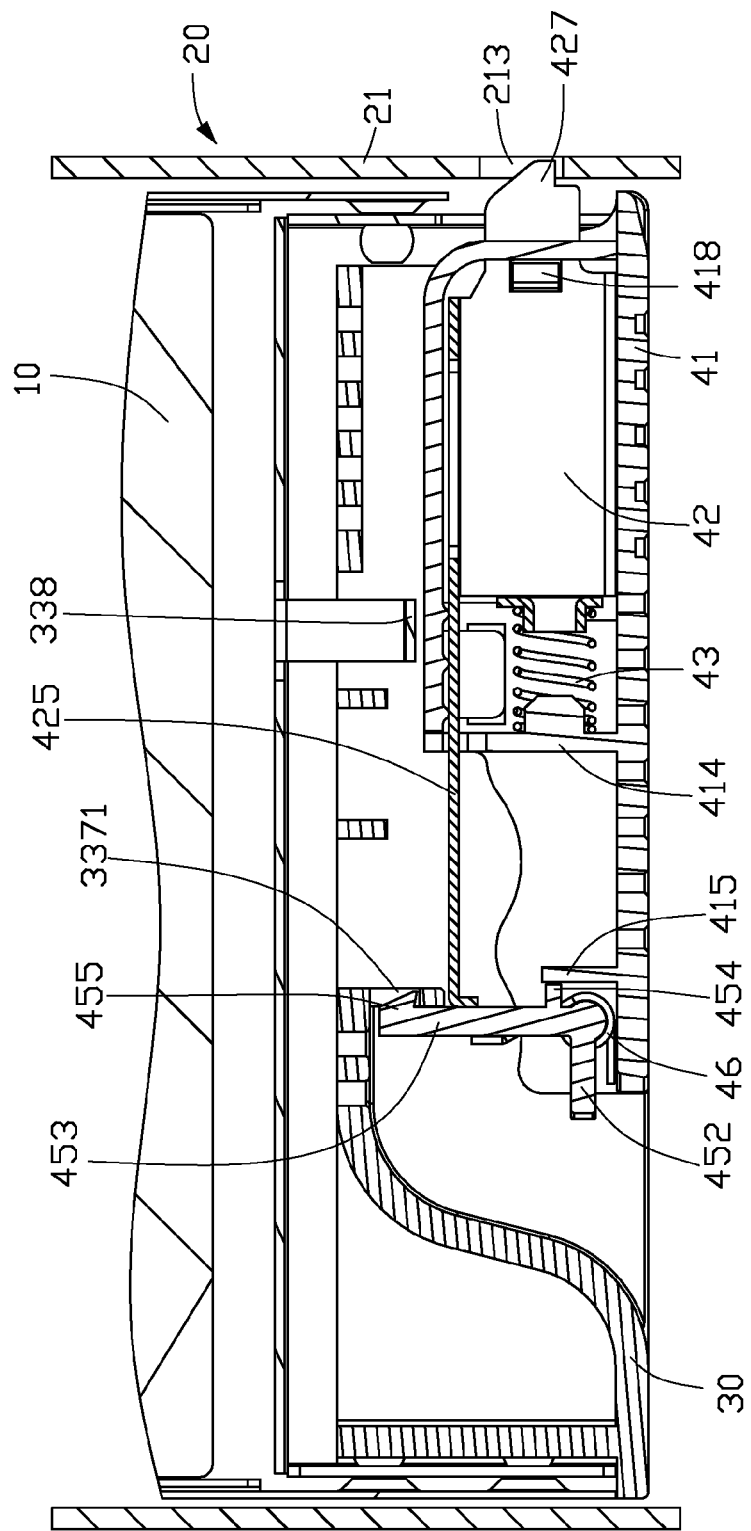
FIG. 6 is similar to FIG. 5, but shows the mounting apparatus fully mounted to the bracket.

Referring to FIGS. 5 and 6, in use, the data storage device 20 is received in the receiving rack 30, which is then moved into the bracket 20. In this process, the contact member 42 of the latching unit 40 is moved inward in response to the latching tabs 427 of the contact member 42 resist the sidewall 21 of the bracket 20. Therefore, the first resilient member 43 of the latching unit 40 is deformed. The pushrod 425 of the contact member 42 rotates the locking member 45 away from the matching board 337, to deform the second resilient member 46, resulting in the latching block 455 of the locking member 45 disengaging from the matching hole 3371 of the matching board 337. When the latching tabs 427 are aligned with the clamping holes 213 of the bracket 20, the elasticity of the first resilient member 43 moves the contact member 42 towards the sidewall 21, with the latching tabs 427 being engaged in the clamping holes 213. As a result, the elasticity of the second resilient member 46 rotates the locking member 45 towards the matching board 337, with the latching block 455 being engaged in the matching hole 3371 of the matching board 337. Therefore, the receiving rack 30 is fixed to the bracket 20 together with the data storage device 10. The deformation of the first resilient member 43 can compensate the deviation of the bracket 20 due to vibration or manufacture error of the bracket 20.

To remove the data storage device 10 from the bracket 20, the operating portion 452 of the locking member 45 is pressed to rotate the locking member 45 away from the matching board 337 of the receiving rack 30. Whereby, the latching block 455 of the locking member 45 is disengaged from the matching hole 3371 of the matching board 337. The latching unit 40 is rotated away from the receiving rack 30 to release the latching tabs 427 from the clamping holes 213 of the bracket 20. At the same time, elasticity of the elastic tab 338 of the receiving rack 30 resists the main board 441 of the positioning member 44 of the latching unit 40, to eject the latching unit 40 outward. Then, the data storage device 10 is readily removed from the bracket 20.

In addition, if the latching tabs 427 of the latching unit 40 do not engage in the clamping holes 213 of the bracket 20 but engage with the sidewall 21 of the bracket 20, the pushrod 425 of the contact member 42 is moved to push the clamping portion 453 of the locking member 45 away from the matching board 337 of the receiving rack 30. Therefore, the latching block 455 of the locking member 45 disengages from the matching hole 3371 of the matching board 337. The latching unit 40 can not latch with the receiving rack 30. This will alarm users that the data storage device 10 is not been fixed to the bracket 20 in position.

In other embodiments, the positioning member 44 of the latching unit 40 may be omitted. Therefore, the elastic tab 338 of the receiving rack 30 directly resists the sidewall 421 of the contact member 42 of the latching unit 40.

Obviously, the contact member 42 of the latching unit 40 can include one latching tab 427 or a plurality of latching tabs 427. Therefore, the sidewall 21 of the bracket 20 can defined one clamping hole 213 or a plurality of clamping holes 213, corresponding to the latching tab 427.

It is believed that the present embodiments and their advantages will be understood from the foregoing description, and they will be apparent that various changes may be made thereto without departing from the spirit and scope of the description or sacrificing all of their material advantages, the examples hereinbefore described merely being exemplary embodiment.

What is claimed is:

1. A mounting apparatus for mounting a data storage device, the mounting apparatus comprising:
   a bracket comprising a sidewall defining at least one clamping hole;
   a receiving rack configured to receive the data storage device; and
   a latching unit pivotally mounted to the receiving rack, the latching unit comprising:
   a fitting member;
   a locking member pivotally mounted to the fitting member; a latching block extending from the locking member to operably latch with the receiving rack;
   a contact member slidably attached to the fitting member; the contact member comprising at least one latching tab, and a pushrod opposite to the at least one latching tab; wherein the at least one latching tab is capable of engaging in the at least one clamping hole, the pushrod is capable of abutting the locking member; and a first resilient member, opposite ends of the first resilient member resisting the contact member and the locking member;

wherein when the at least one latching tab is moved away from the at least one clamping hole of the bracket and engages with the sidewall of the bracket, the first resilient member is deformed, the pushrod is moved to rotate the locking member, resulting in the latching block disengaging from the receiving rack, thereafter, elasticity of the first resilient member is capable of moving the at least one latching tab to engage in the at least one clamping hole again.

2. The mounting apparatus of claim 1, wherein the receiving rack comprises an elastic tab, the elastic tab elastically resists the contact member to push the latching unit away from the receiving rack.

3. The mounting apparatus of claim 2, wherein the receiving rack defines a receiving groove, the latching unit is pivotally received in the receiving groove, and the elastic tab extends from an inner sidewall of the receiving rack.

4. The mounting apparatus of claim 1, wherein the receiving rack comprises opposite side plates for sandwiching the data storage device, and a fixing member, the fixing member comprises a resisting plate connecting the side plates, and two fixing plates extending from opposite edges of the resisting plate, each fixing plate defines a pivoting hole, two fixing shafts extend from the fitting member, to engage in the pivoting holes, respectively.

5. The mounting apparatus of claim 4, wherein the two fixing plates are defined a receiving groove to receive the latching unit, an elastic tab extends inward the receiving groove from the resisting plate, the elastic tab elastically resists the contact member, to rotate the latching unit out of the receiving groove.

6. The mounting apparatus of claim 5, wherein the fixing member further comprises a matching board formed in the receiving groove, connected to the fixing plates, a matching hole is defined in the matching board, the latching block is engaged in or disengaged from the matching hole.

7. The mounting apparatus of claim 4, wherein the fitting member comprises opposite securing panels, the fixing shafts extend from the securing panels, respectively, two shaft slots are defined in the securing panels, respectively, away from the fixing shafts, the locking member comprises a pivoting shaft, opposite ends of the pivoting shaft are rotatably engaged in the shaft slots, respectively.

8. The mounting apparatus of claim 7, wherein the locking member further comprises a clamping portion extending from a circumference of the pivoting shaft, the latching block is wedge-shaped, and protrudes from a first side of the clamping portion, the pushrod abuts the first side of the clamping portion.

9. The mounting apparatus of claim 8, wherein a matching board is formed between the fixing plates of the receiving rack, a matching hole is defined in the matching board, the latching block is engaged in or disengaged from the matching hole.

10. The mounting apparatus of claim 8, wherein the latching unit further comprises a second resilient member, the second resilient member is a torsional spring having two feet, the fitting member further comprises a baffle plate connected to the securing panels, one foot resists the baffle plate, another one of the feet resists a side of the clamping portion opposite to the first side of the clamping portion.

11. The mounting apparatus of claim 7, wherein a first connecting board is formed between the securing panels, a fixing post extends from the first connecting board, the contact member further comprises a connecting wall, a fixing post extends from the connecting wall, opposite ends of the first resilient member are fitted abut the fixing posts, respectively.

12. A mounting apparatus for mounting a data storage device, the mounting apparatus comprising:
a bracket comprising a sidewall defining at least one clamping hole;
a receiving rack to receive the data storage device; and
a latching unit pivotally mounted to the receiving rack, the latching unit comprising:
a fitting member;
a locking member pivotally mounted to the fitting member; a latching block extending from the locking member to be operably latched with the receiving rack;
a contact member slidably received in the fitting member; the contact member comprising at least one latching tab, and a pushrod opposite to the at least one latching tab, the pushrod abutting the locking member;
a first resilient member, opposite ends of the first resilient member resisting the contact member and the locking member; and
a second resilient member resisting the contact member and the fitting member;
wherein while impelling the receiving rack into the bracket, the at least one latching tab resists the sidewall of the bracket, to move the contact member away from the sidewall of the bracket to deform the first resilient member; together, the pushrod resists the locking member to rotate, such that the latching block is disengaged from the receiving rack, the second resilient member is deformed; and when the at least one latching tab engages in the at least one clamping hole, elasticity of the first resilient member moves the contact member towards the sidewall of the bracket, and the elasticity of the second resilient member rotates the latching member towards the contact member, together with the latching block being hooked in the receiving rack.

13. The mounting apparatus of claim 12, wherein the receiving rack comprises opposite side plates for sandwiching the data storage device, and a fixing member, the fixing member comprises a resisting plate connecting the side plates, and two fixing plates extending from opposite ends of the resisting plate, each fixing plate defines a pivoting hole, two fixing shafts extend from the fitting member, to engage in the pivoting hole, respectively.

14. The mounting apparatus of claim 13, wherein the two fixing plates are boned to form a receiving groove to receive the latching unit, an elastic tab extends into the receiving groove from the resisting plate, and the elastic tab elastically resists the contact member to push the latching member out of the receiving groove.

15. The mounting apparatus of claim 14, wherein the fixing member further comprises a matching board formed in the receiving groove, connected to the fixing plates, a matching hole is defined in the matching board, the latching block is engaged in or disengaged from the matching hole.

16. The mounting apparatus of claim 13, wherein the fitting member comprises opposite securing panels, the fixing shafts extend from the securing panels, respectively, two shaft slots are defined in the securing panels, respectively, away from the fixing shafts, the locking member comprises a pivoting shaft, and opposite ends of the pivoting shaft are rotatably engaged in the shaft slots, respectively.

17. The mounting apparatus of claim 16, wherein the locking member further comprises a clamping portion extending from a circumference of the pivoting shaft, the latching block is wedge-shaped, and protrudes from a first side of the clamping portion, and the pushrod abuts the first side of the clamping portion.

18. The mounting apparatus of claim 17, wherein a matching board is formed between the fixing plates, a matching hole is defined in the matching board, and the latching block is engaged in or disengaged from the matching hole.

19. The mounting apparatus of claim 17, wherein the second resilient member is a torsional spring having two feet, the fitting member further comprises a baffle plate connected to the securing panels, one foot resists the baffle plate, and the other foot resists a side of the clamping portion opposite to the first side of the clamping portion.

20. The mounting apparatus of claim 16, wherein a first connecting board is formed between the securing panels, a fixing post extends from the first connecting board, the contact member further comprises a connecting wall, a fixing post extends from the connecting wall, and opposite ends of the first resilient member are fitted abut the fixing posts, respectively.

* * * * *